(12) United States Patent
Maximus et al.

(10) Patent No.: US 8,665,518 B2
(45) Date of Patent: Mar. 4, 2014

(54) STEREO DISPLAY SYSTEM WITH SCANNING OF LIGHT VALVES

(75) Inventors: Bart Maximus, Oudenaarde (BE); Gino Priem, Kruishoutem (BE)

(73) Assignee: Barco N.V., Kortrijk (BE)

( * ) Notice: Subject to any disclaimer, the term of this patent is extended or adjusted under 35 U.S.C. 154(b) by 291 days.

(21) Appl. No.: 12/668,857

(22) Filed: Jan. 12, 2010

(65) Prior Publication Data
US 2010/0202047 A1    Aug. 12, 2010

(30) Foreign Application Priority Data
Jul. 13, 2007 (EP) .................................. 07013767

(51) Int. Cl.
   G02B 27/22    (2006.01)
   G03B 21/00    (2006.01)
(52) U.S. Cl.
   USPC ................. 359/464; 359/462; 348/54; 353/7
(58) Field of Classification Search
   USPC ........ 359/462, 627, 572, 464; 348/46, 57, 54; 385/4; 353/7
   See application file for complete search history.

(56) References Cited

U.S. PATENT DOCUMENTS

| | | | |
|---|---|---|---|
| 5,982,538 A | | 11/1999 | Shikama et al. |
| 5,982,553 A | * | 11/1999 | Bloom et al. ................. 359/627 |
| 6,271,808 B1 | * | 8/2001 | Corbin .............................. 345/7 |
| 6,456,432 B1 | * | 9/2002 | Lazzaro et al. ............... 359/464 |
| 6,480,634 B1 | * | 11/2002 | Corrigan ............................ 385/4 |
| 6,831,678 B1 | * | 12/2004 | Travis ............................. 348/46 |
| 2002/0071178 A1 | * | 6/2002 | Suganuma .................... 359/462 |
| 2006/0164601 A1 | | 7/2006 | Akiyama |

OTHER PUBLICATIONS

Communication from EPO concerning European Patent Application No. 08775061.8, Mar. 4, 2011.
International Search Report established in PCT/EP2008/059200, Nov. 6, 2008.

* cited by examiner

*Primary Examiner* — Audrey Y Chang
(74) *Attorney, Agent, or Firm* — Bacon & Thomas, PLLC (57) ABSTRACT

A display method and system are described for displaying a stereo image comprising a first image and a second image. A light valve array comprising an array of light valve elements is driven according to an image and a light source is provided for generating a shaped light beam which can illuminate a portion of the light valve array. A scanning device is provided which is arranged to scan the shaped light beam across the light valve array. Light valve elements of the same light valve array are caused to sequentially adopt a state representative of the first image of the stereoscopic image and a state representative of the second image, and to cause the light valve elements to adopt a new state representative of one of the first and second images in advance of the scanning by the shaped light beam and to change to a new state representative of the other of the first and second images during a period between successive scans of the shaped light beam.

15 Claims, 10 Drawing Sheets

STEREO DISPLAY SYSTEM WITH SCANNING OF LIGHT VALVES

FIELD OF THE INVENTION

This invention relates to display systems which form a stereoscopic image by projection, to a method for forming a stereo image, and software for controlling operation of a display system to produce such an image.

BACKGROUND TO THE INVENTION

Humans and many animals have binocular vision provided by two eyes which look in the same direction. Two parallel aligned but spaced eyes deliver two slightly different images of the same scene. This is due to the 4 to 6 cm separation between the eyes, which makes each eye have a slightly different viewpoint. The images from these two different viewpoints are sent to the brain, and this difference, which is termed parallax, is interpreted as depth. The nearer an object is to the eyes, the greater the difference between the two images. From the difference between the two images, the brain can display an impression of depth.

It is understood that depth perception, or the capacity to perceive the environment in three dimensions, is based on the fact that the right and the left eye of a viewer observe the environment from a slightly different point of view. Therefore, the images perceived by the right and the left eye differ from each other to some extent, and the difference between the images makes it possible to perceive the surrounding space in three dimensions.

Various schemes for displaying moving three dimensional images are known. One common stereoscopic display technique simultaneously displays two images which are encoded for the left eye and right eye by means of different optical polarisations, or colours (e.g. red and green). A viewer wears a pair of special glasses which have filters in front of the left and right eyes. The filters are arranged to influence the way each eye sees the relevant image on the display, i.e. the filters are arranged to pass only the image intended for that eye, i.e. a left eye sees only the image intended for that eye. The filters may be polarisers or include colour filters such as red and green filters.

Another stereoscopic display technique sequentially presents an image intended for the left eye, and an image intended for the right eye. A user wears a special pair of glasses which are shuttered in synchronism with the displayed images, such that the left eye shutter is open during the period when the left eye image is displayed, and the right eye shutter is open during the period when the right eye image is displayed. The frequency of the shutter is adapted to the frequency of the displayed images. The shutters can be mechanical, or can be based on an electro-optical technology such as liquid crystal panels. The quality of the stereoscopic effect is dependent on the extent to which the left eye and right eye images are separated. It is undesirable that any part of a right eye image should be viewed by the left eye, or that any part of a left eye image should be viewed by the right eye.

WO 03/003750 describes a stereoscopic display system using shuttered glasses. Two video projectors are used, and the output of each projector is shuttered in synchronism with the glasses worn by a viewer. When the right-eye shutter of glasses worn by a viewer is open, a shutter associated with the output of the projector providing the left-eye image is shut. Similarly, when the left-eye shutter of glasses worn by a viewer is open, a shutter associated with the output of the projector providing the right-eye image is shut. It is described how this can ensure a good isolation between the left and right eye channels but it has a considerable disadvantage of requiring two projectors, which increases the cost of the apparatus and also requires the pair of projectors to be accurately aligned with one another.

Projectors for video images originally used cathode ray tubes (CRT), but more recently other technologies have been developed where a light beam is applied to an array of selectable light valve elements (also called a spatial modulator). The light valves can use a transmissive technology, such as liquid crystal panels in which elements are individually switched to a level of opaqueness depending on the brightness required for a pixel of the image at that location. Other technologies are based on reflecting light from an array of light valve devices, such as Liquid Crystal On Silicon (LCOS) or Digital Light Processing (DLP).

It is desirable to provide a stereoscopic display using a single projector as this reduces the cost of the apparatus and overcomes the problems of aligning multiple projectors. However, if a single projector having a single light valve array is used, the array is required to quickly change between displaying a left eye image and displaying a right eye image. Some light valve technologies—especially those based on liquid crystal—cannot be instantly switched between displaying a first image and a second image but, instead, have a delay of the order of milliseconds. WO 03/003750 acknowledges this problem in proposing a shuttered two-projector solution.

SUMMARY OF THE INVENTION

Accordingly, it is an object of the present invention to provide an improved method and apparatus for displaying stereoscopic images. In particular the present invention provides a single projector apparatus solution for displaying stereoscopic images.

A first aspect of the present invention provides a display system for displaying a stereoscopic image comprising a first image and a second image, the system comprising:

a light valve array comprising an array of light valve elements;

a light source for generating a shaped light beam which can illuminate a portion of the light valve array, the portion being different from the complete light valve array;

a scanning device which is arranged to scan the shaped light beam across the light valve array;

a control device arranged to cause light valve elements of the same light valve array to sequentially adopt a state representative of the first image of the stereoscopic image and a state representative of the second image, to cause the light valve elements to adopt a new state representative of one of the first and second images in advance of the scanning by the shaped light beam and to change to a new state representative of the other of the first and second images during a period between successive scans of the shaped light beam.

To provide the shaped light beam, a beam-shaping element can be provided which is arranged to receive the light beam and to form the shaped light beam. Alternatively, a movable LED or laser array can be used thus combining the light source and beam shaping elements in a single unit.

An advantage of the present invention is that it allows a single projector to display high quality stereoscopic images, with minimal leakage between left and right eye images, while using relatively slowly responding light valve arrays. Since only part of the entire light valve array is illuminated at any time, in view of the shaping of the light beam, the light valve elements can be switched to their new state for the next image during the period when they are not illuminated. This avoids leakage of left eye image into the right eye of a viewer, and vice versa.

A consequence of illuminating only part of the light valve array at any time is that the amount of projected light is reduced. To compensate for this, it is preferred that a concentrated light source is used. A preferred light source is a laser although another, less desirable, alternative is to use a bulb in combination with optionally suitable apparatus to recover lost light, such as the arrangement described in EP 1 274 256. When a laser is used as the light source, the shaped beam can have a height of the order of several pixels. Alternative suitable light sources include UHP lamps (or other types of lamp) and LEDs. However some light sources have the disadvantage of high etendue, so that a shaped beam with a height of the order of several pixels may result in a very low brightness depending on the etendue of the complete projection system.

The present invention provides a stereoscopic display system particularly adapted to display a stereo image. The present application provides a stereoscopic technique that is capable of displaying three-dimensional visual information or creating the illusion of depth in an image. The illusion of depth in a photograph, movie, or other two-dimensional image is created by presenting a slightly different image to each eye.

According to an aspect of the present patent application, 3D stereoscopic images are projected and selected for the left or right eye by a pair of switched shutters, and a single projector apparatus solution is applied. Hence, the present application provides a cost saving and accurate possibility to obtain 3D colour images. In particular, undesired crosstalk in shape of "ghost images" is reduced or avoided.

The present invention has the advantage of providing colourful 3D images while reducing or avoiding undesired crosstalk.

The stereo image which is projected can be a still image or a moving image (video).

A further aspect of the present invention provides a method of forming a stereo image comprising a first image and a second image, the method comprising:

generating a light beam which can illuminate only a portion of a light valve array;

scanning the light beam across the light valve array, the light valve array comprising an array of light valve elements;

causing light valve elements of the same light valve array to sequentially adopt a state representative of the first image of the stereoscopic image and a state representative of the second image; and, causing the light valve elements to adopt a new state representative of one of the first and second images in advance of the scanning by the light beam and to change to a new state representative of the other of the first and second images during a period between successive scans of the light beam.

Generating a light beam which can illuminate only a portion of a light valve array may included applying a generated light beam to a beam-shaping element to form a shaped light beam which can only illuminate a portion of a light valve array, after which the shaped light beam is made to impinge on the light valve elements.

The method can be controlled by a controller which is implemented in software, hardware or a combination of these. The invention can be implemented by means of hardware comprising several distinct elements, and by means of a suitably programmed processor. Accordingly, another aspect of the invention provides software comprising control logic in the form of instructions (code) which, when executed by a computer or processor, implements the method. The software may be tangibly embodied on an electronic memory device, hard disk, optical disk or other machine-readable storage medium or it may be downloaded to the apparatus via a network connection.

BRIEF DESCRIPTION OF THE DRAWINGS

Embodiments of the invention will be described, by way of example only, with reference to the accompanying drawings in which.

DESCRIPTION OF PREFERRED EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
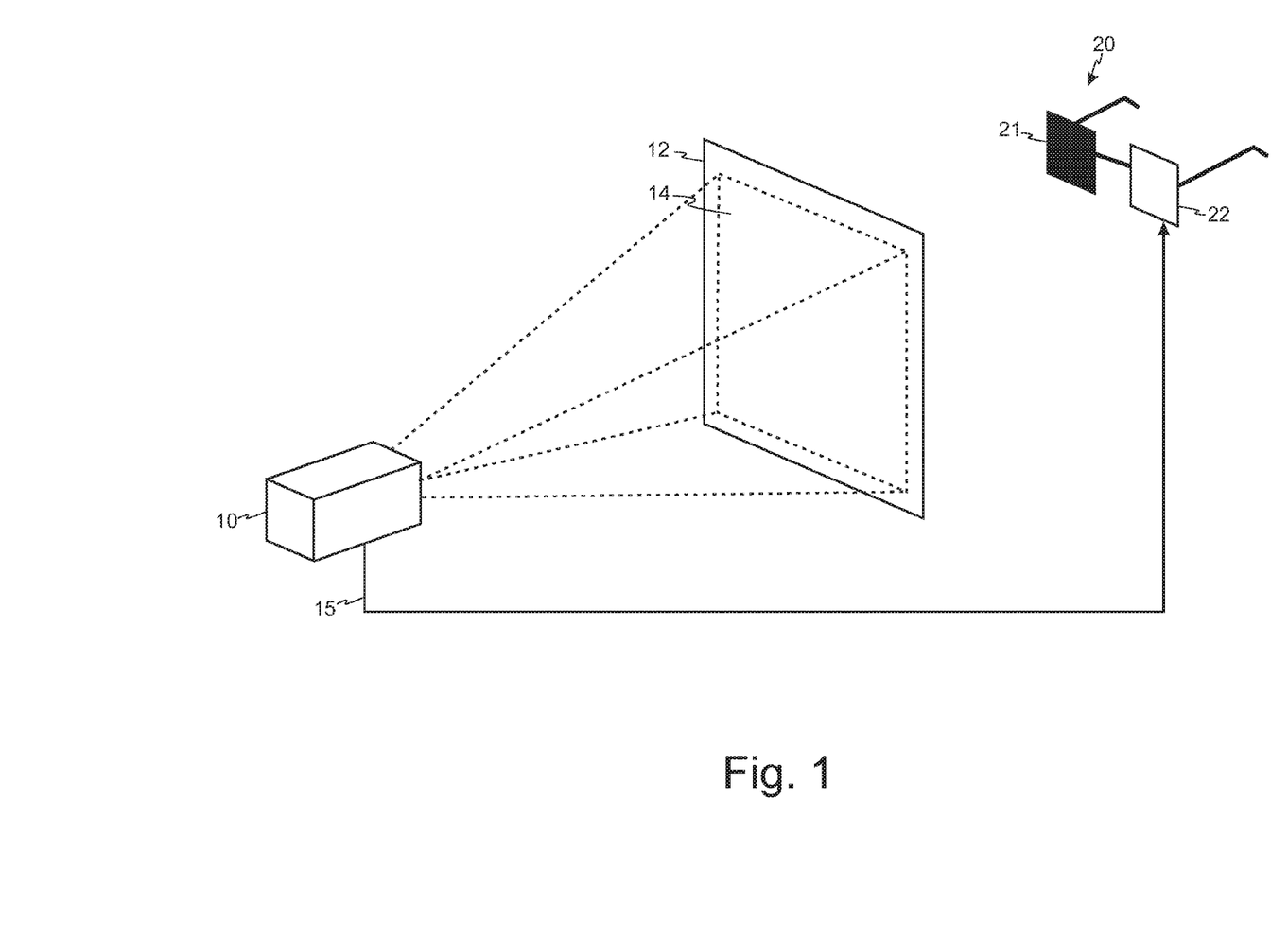
FIG. 1 schematically shows a display system for displaying a stereo image in accordance with embodiments of the present invention.

FIG. 1 shows a display system for projecting, and viewing, a stereoscopic image. A projector 10 alternately projects a first image (e.g. left eye image) and a second image (e.g. right eye image) on a screen 12. The first and second images, when received by a viewer within a suitably short time frame, allow the viewer to see an image in 3D. A special pair of shuttered glasses 20 are worn by a viewer. The glasses 20 comprise lenses 21, 22 which are alternately shuttered in synchronism with the images projected on screen 12. A control signal 15 is sent from projector 10 to the glasses 20, such as by a wired or wireless link, and provides instructions on when to operate the shutters 21, 22. At any time, one of the shuttered lenses 21, 22 is open while the other one of lenses 21, 22 is closed. In the arrangement shown in FIG. 1, left-eye shutter 22 is open during the period when an image 14 which is intended for viewing by the left eye is projected on screen 12 and shutter 21 is closed. Similarly, right-eye shutter 21 is open during the period when an image 14 which is intended for viewing by the right eye is projected on screen 12 and shutter 22 is closed. FIG. 1 shows a rear projection display system, where an image is projected on a first side of the screen 12 and an image is viewed from the opposite, second, side of the screen. The invention can also be applied to front projection systems where an image is projected onto the same side of the screen 12 as an image is viewed by a viewer. The shutters 21, 22 can use an electro-mechanical, or electro-optical technology (e.g. liquid crystal panels) and this is not important to the invention. However, if the shutters are LCD shutters, they may suffer from 'lag' problems.

The shuttering on the glasses should be synchronised to the scanning illumination so that the shutter is switched to open when the illuminated strip crosses the whole display from top to bottom. This means that there is a constant delay compared to the vertical sync of the light valve.

The LCD shutter can be turned on/off across the entire lens. However the present invention includes that it is progressively swept across the lens linked to the screen position. This is less preferred as turning the head would result in seeing a different (wrong) display section hence providing only a small freedom of movement.

Figure 2:
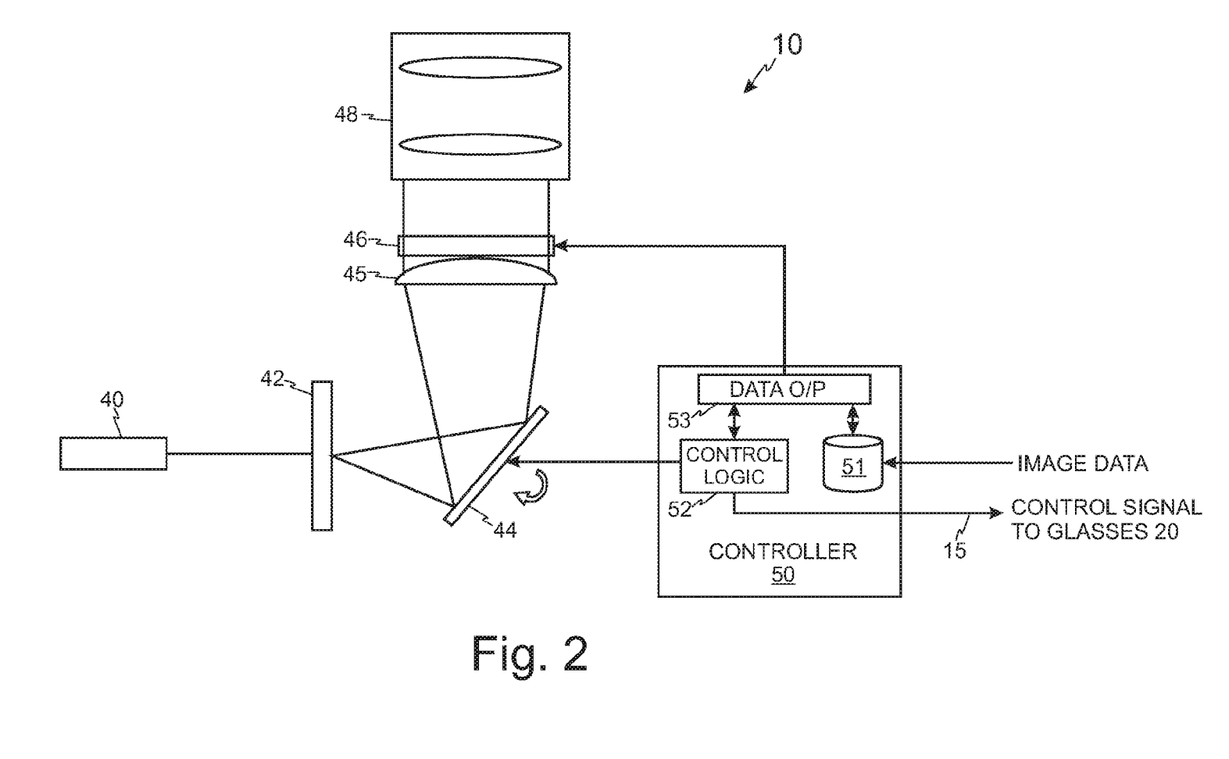
FIG. 2 shows a projector according to an embodiment of the present invention.

FIG. 2 shows a projector 10 according to an embodiment of the present invention. The projector 10 comprises a light source 40, a beam-shaper 42, a scanning device 44, a light valve array 46 and a projection lens assembly 48. The light valve array 46 comprises a two-dimensional array of light valve elements. Each light valve element corresponds to a pixel of the image and can be individually controlled to allow an amount of light to pass through/be reflected from that element. Typically, each light valve element is controlled across a range of values (e.g. 256) between 'on' and 'off' to provide a range of greyscale values. The light valve array 46 can be a transmissive technology, such as liquid crystal panels in which elements are switched on, off or a value somewhere between on and off, depending on the amount of light that is required to be transmitted at that pixel location. Alternatively, the light valve array 46 can use a reflective technology such as Liquid Crystal On Silicon (LCOS).

Light from source 40 is applied to a beam-shaper 42. The beam-shaper 42 forms a beam of a shape and/or size which is required for illuminating the light valve array 46. A preferred light source 40 is a laser which emits a concentrated beam of light. In this case, the beam-shaper 42 'stretches' the laser beam in one direction. The beam-shaper 42 can be a diffractive element. The shaped light beam is applied to a scanning device 44. The scanning device 44 causes the shaped light to be scanned across the light valve array 46 in a controlled manner. Scanning device 44 can be a mirror which is driven by a motor under the control of a control signal from controller 50. The present invention includes any suitable scanning device such as a moving prism, rotating wheel, AOM, or a motor on the laser itself, etc.

Figure 3:
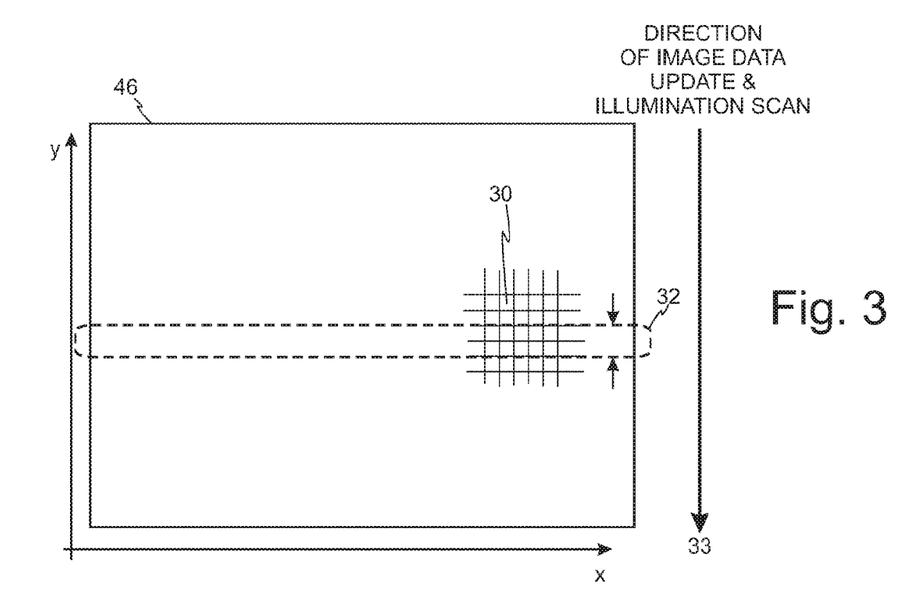
FIG. 3 shows the light valve array of FIG. 2 being scanned by a light beam.

The scanning of the light valve array can take the form of a raster scan in which the light beam is sequentially scanned along each line of the light valve array, from one side to the other. However, a preferred scanning technique is to scan the light valve array on a line-by-line basis, starting from the top of the array 46, and working towards the bottom of the array. FIG. 3 shows the light valve array 46. A small cluster 30 of light valve elements is shown in detail. The two-dimensional light valve array 46 is shown with a horizontal axis x, representing lines of pixels, and a vertical axis y representing columns of pixels. An example scanning beam 32 is shown passing over the cluster of pixels 30. In this example, the beam 32 has a height of two pixels and is wide enough to illuminate an entire row. To achieve this beam 32, beam-shaper 42 has suitable optical components to widen the beam to the required width of the light valve array 46 and to increase the height of the beam to the required number of pixels. Other shapes of beam can be achieved by appropriate selection of the components of the beam-shaper 42. In accordance with an embodiment of the present invention the beam-shaping element is arranged to form a shaped light beam which is at least as wide as the light valve array in a first direction, and wherein the scanning device is arranged to scan the shaped beam across the light valve array in a second direction which is orthogonal to the first direction. The shaped beam can have a dimension which is less than 20% or less than 10% of the total dimension of light valve array in the second direction.

In other embodiments the beam-shaping element is arranged to form the shaped beam which has a dimension small such as down to substantially equal to the dimension of a single light valve element of the light valve array in the second direction, i.e. a depth of one pixel. A suggested beam size is 1-10 pixels high. In a particular embodiment the illumination size can be equal to the blanking area. For example, the beam size that can be used can depend on the speed that a panel is or could be written.

Figure 8A:
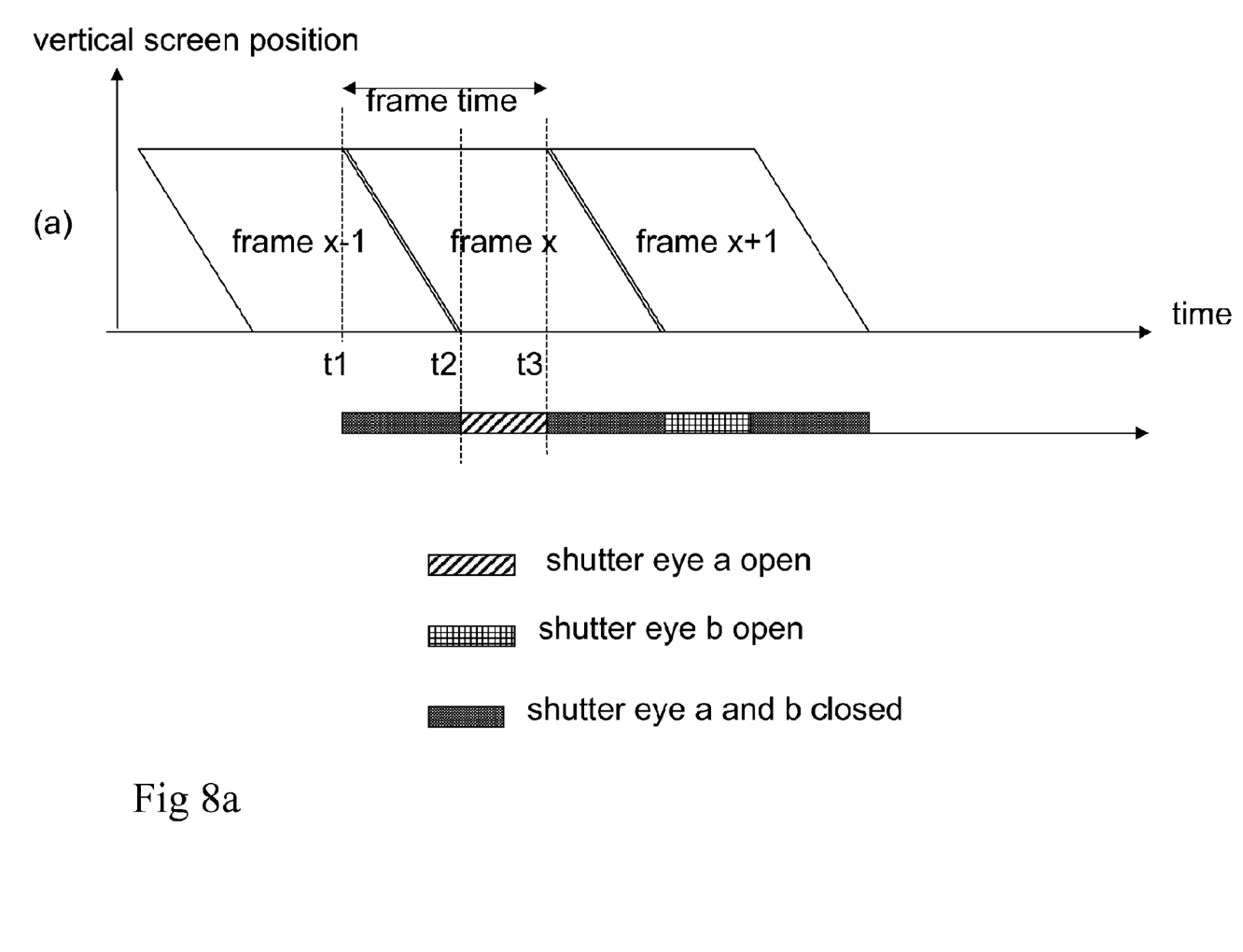
FIGS. 8a and b show timing diagrams in accordance with embodiments of the present invention.

With reference to FIG. 8a, this figure represents the general situation without scrolling illumination. At time t1, a new frame x starts to be written. The writing is finished at time t2. At time t3, the next frame is written (time between t2 and t3 is called blanking). Suppose now that shuttered glasses are used that turn on/off across the entire filter. To avoid crosstalk between the two eyes, the time that a single shutter is open is limited to t3−t2.

In most cases, the frame time is almost equal to t2−t1, so that t3−t2 is practically zero. In other words, this approach is not very practical.

On the other hand, if the complete panel would be written at once (i.e. t1=t2), this approach would be possible. However it is a different, less common and more complex technology to make such panels with a complete image refresh at the time.

Figure 8B:
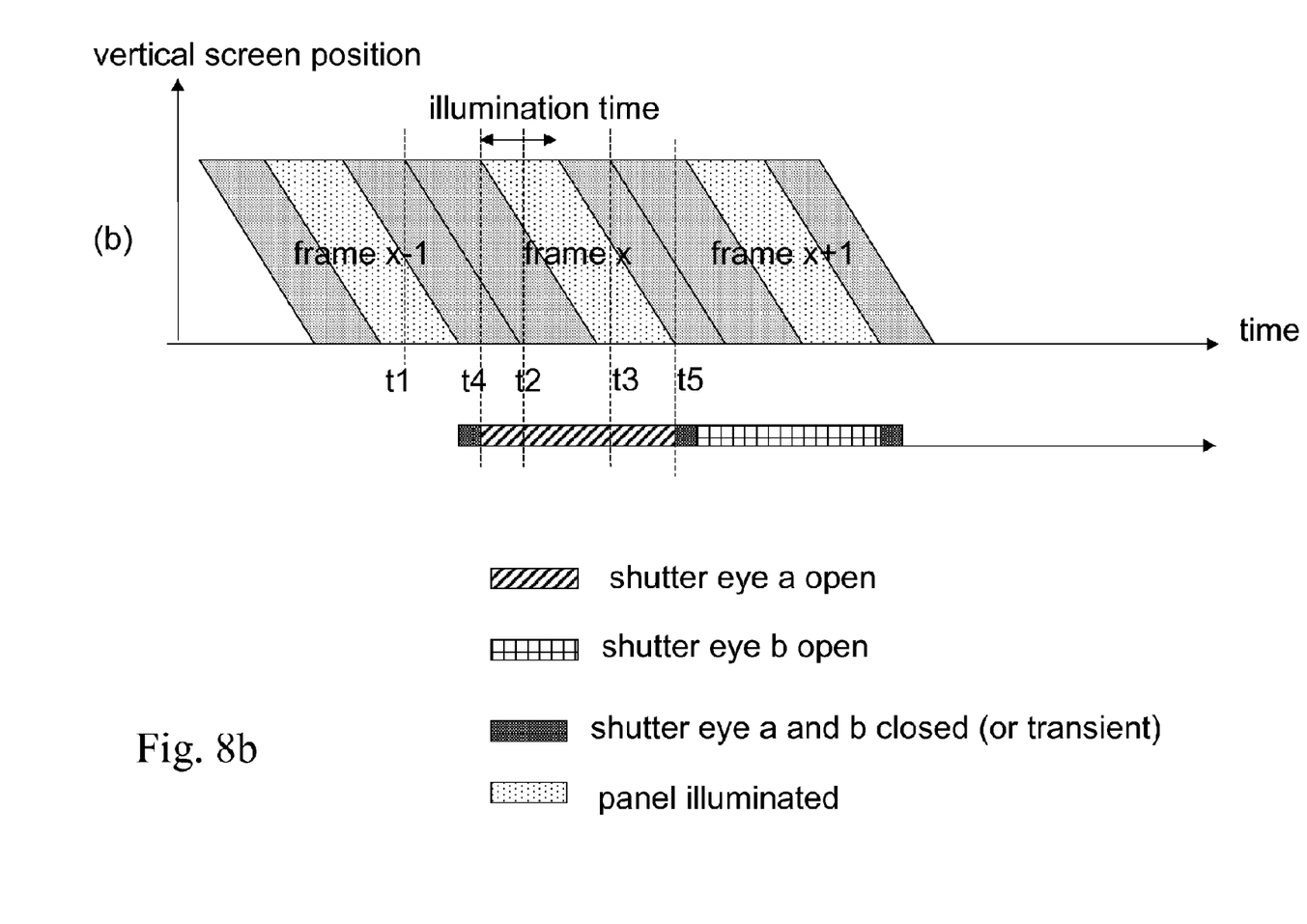

The situation represented in FIG. 8b shows the use of scrolling illumination. Now, a single shutter can be open for almost the entire frame, taking into account the speed of the switching. The shutter for eye a is e.g. opened at time t4 and closed at time t5 (with t5−t4<=frame time). In this time, the illuminating beam must be swept across the panel.

A particular situation of FIG. 8(b) is the following: if the panel refresh rate and scrolling rate of the illumination are the same and the time that each shutter is opened is approximately equal to the frame time, then the illumination time is equal to the blanking time. By using a laser, this approach is possible, even for a blanking time corresponding to a few pixels.

Many variations on this example are included within the scope of the present invention. For example, but not limiting, this principle can be used with a different opening time of the shutter, start time of the shutter, different panel refresh rate and scrolling illumination rate.

It should be noted that faster scrolling allows use of larger illumination times. However the scrolling rate is limited by the difference between t4 and t2 (otherwise crosstalk will occur).

If the starting position of t4 is close to t1, there is little delay between processing and displaying the image, however the light valve might not yet be fully switched to its final position (e.g. if the response time of a liquid crystal light valve is large).

An approach to solve this is using overdrive. Overdrive is a method of reducing the response time of some light valve elements by increasing the drive voltage, e.g. drive voltage difference above that which is required to generate the particular value the light valve element is to adopt for a certain period of time. Once the adaption has been speeded-up by means of the overdrive, the drive voltage, e.g. drive voltage difference is reduced to the correct value in one or more steps.

If the starting position of t4 is close to t3, there is much delay between processing and displaying the image, however the image on the light valve will be much closer to its final transmission or reflection value.

Also note that a smaller beam size will result in light loss if the etendue of the light source is large. For lasers, this is generally not a problem.

Referring again to FIG. 2, the lens 45 in front of the light valve array 46 is not essential. It is for directing the light illuminating the light valve in the direction of the entrance pupil of the projection lens (telecentricity is a special case with the entrance pupil at infinity). Without this lens, the light output could be smaller and the uniformity less good.

Light which is transmitted through the light valve array 46 (or reflected from the light valve array 46, if a reflective technology is used) is applied to a projection lens assembly 48. This focuses light onto a display screen, which could be mounted integrally with the projector, as in the case of a rear-projection display unit, or a screen which is mounted separately from the projector, such as a wall, floor or ceiling mounted screen.

FIG. 3 shows the light valve array being scanned by beam 32 in direction 33 along the y axis of the array, starting at the top of the array 46, and scanning downwards. Elements of the light valve array are set to a required state, on a line-by-line basis, in the same direction 33 as the array 46 is scanned. Elements are set to a required state a sufficient time in advance of those elements being scanned by beam 32. Once the elements have been scanned, they can be set to the state required for the next image.

Figure 4:
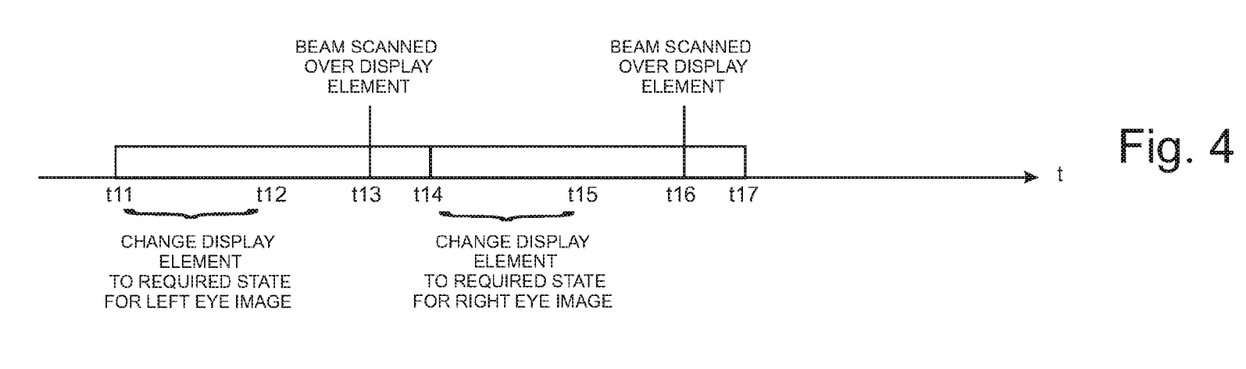
FIG. 4 shows a time line for an element of the light valve array of FIGS. 2 and 3.

FIG. 4 shows an example time line for events affecting a particular element, or a particular line of elements, of the light valve array 46. At time t11 the element is instructed to change to the required state for a left eye image. Taking the example of a transmissive LCD panel, the instruction could be to set the element to an opaqueness value of 125 in the range 0-255. The element cannot immediately assume the new state, but takes a period of time until t12 to reach the new state. At a slightly later time t13 the illuminating beam 32 is swept across that line of elements and the illuminating light, in that pixel location, is modulated according to the state of the element. At time t14 the element is instructed to change to the required state for a right eye image. As an example, the instruction could be to set the element to an opaqueness value of 0 in the range 0-255. Again, the element cannot immediately assume the new state, but takes a period of time until t15 to reach the new state. At a slightly later time t16 the illuminating beam 32 is, again, swept across that line of elements and the illuminating light, in that pixel location, is modulated according to the state of the element. It can be seen that the element is only illuminated at the times t13 and t16, and a very short period on each side of these times, dependent upon the height (in the y-axis direction) of the beam 32. At other times, the display element can change to the state required for the next image. This is particularly advantageous with elements which take some time to assume a new state, such as liquid crystal-based display elements. It can also be seen that some elements of the array 46 can be set to values for displaying a left eye image, and other elements can be set to values for displaying a right eye image without diminishing the stereoscopic effect to a viewer. This is possible because it is only those elements which are illuminated by beam 32 which contribute to the displayed image at any point in time.

Controller 50 controls the rate at which the scanning device 44 scans the light valve array 46 and controls the rate at which image data is applied to the light valve array 46 to implement the method previously described. Image data can be buffered 51 at controller 50 before being read out via an output interface 53 to the light valve array 46 on a line-by-line basis. The time difference (which will be constant for every frame) between the refresh of a selected row of the array 46 and the illumination of that row of the array 46 should be set to an optimal value. If this time difference is low then the liquid crystal is not given a lot of time to switch so the refreshed information is not yet completely displayed. An approach to solve this is overdrive. On the other hand, the delay between the image generation in the image generator and the visualisation on the screen is small, which is preferable in some applications. If the difference is high (almost equal to a frame time) then the liquid crystal will have almost or completely switched to the refreshed information. On the other hand there will be more delay between the image generation and the visualisation of the image by the projector.

The scanned illumination can go back from the bottom row to the top row of the light valve during the time interval which is foreseen for the video blanking signal, but after an additional delay which is determined by the method described above.

The illumination goes back from the bottom to the top when the illumination of the bottom line has been started, when the writing of the new image at the top line has been started, and taking a delay into account that enables the pixels of that top line to go through the transient and switch to the new image.

In the situation with the laser illumination the transfer can be done by using a polygon mirror, or by using a much faster movement on a motor, AOM, so that the transfer goes much faster as during the illumination period. The laser can be temporarily shut off or the light can be temporarily blocked off during this period to avoid illumination of the light valves during this transfer period.

Image data can take the form of digital image data or analog data which is sampled at a required rate by controller 50 to generate digital data to drive the array 46. The image data can be derived from a broadcast source (e.g. satellite, terrestrial, cable, IP-network), playback of recorded matter from a data store (e.g. hard disk, memory card, optical disc) or it may generated in real-time, such as the output of a graphics card of a computer.

The control logic 52 of the controller 50 can be implemented entirely in hardware or, more conveniently, as a processor executing software.

A consequence of illuminating only part of the light valve array at any time is that the amount of projected light is reduced. To compensate for this, it is preferred that a concentrated light source is used. A preferred light source is a laser although other, less desirable alternative is to use a bulb in combination with suitable apparatus to recover lost light, such as the arrangement described in EP 1 274 256. When a laser is used as the light source, the shaped beam can have a height of the order of several pixels. A shaped beam of this size would have an unacceptably low brightness if a non-laser light source were used.

The above description describes the basic method required to display a stereo image in a single colour. Full-colour displays typically generate images in three primary colours— red, green and blue. For an embodiment with laser illumination, a red laser, green laser and blue laser are required. Instead of a laser, LEDs or other light sources can be used. There are two alternative ways of implementing the projector.

(i) One Light Valve Per Colour Channel

Figure 5:
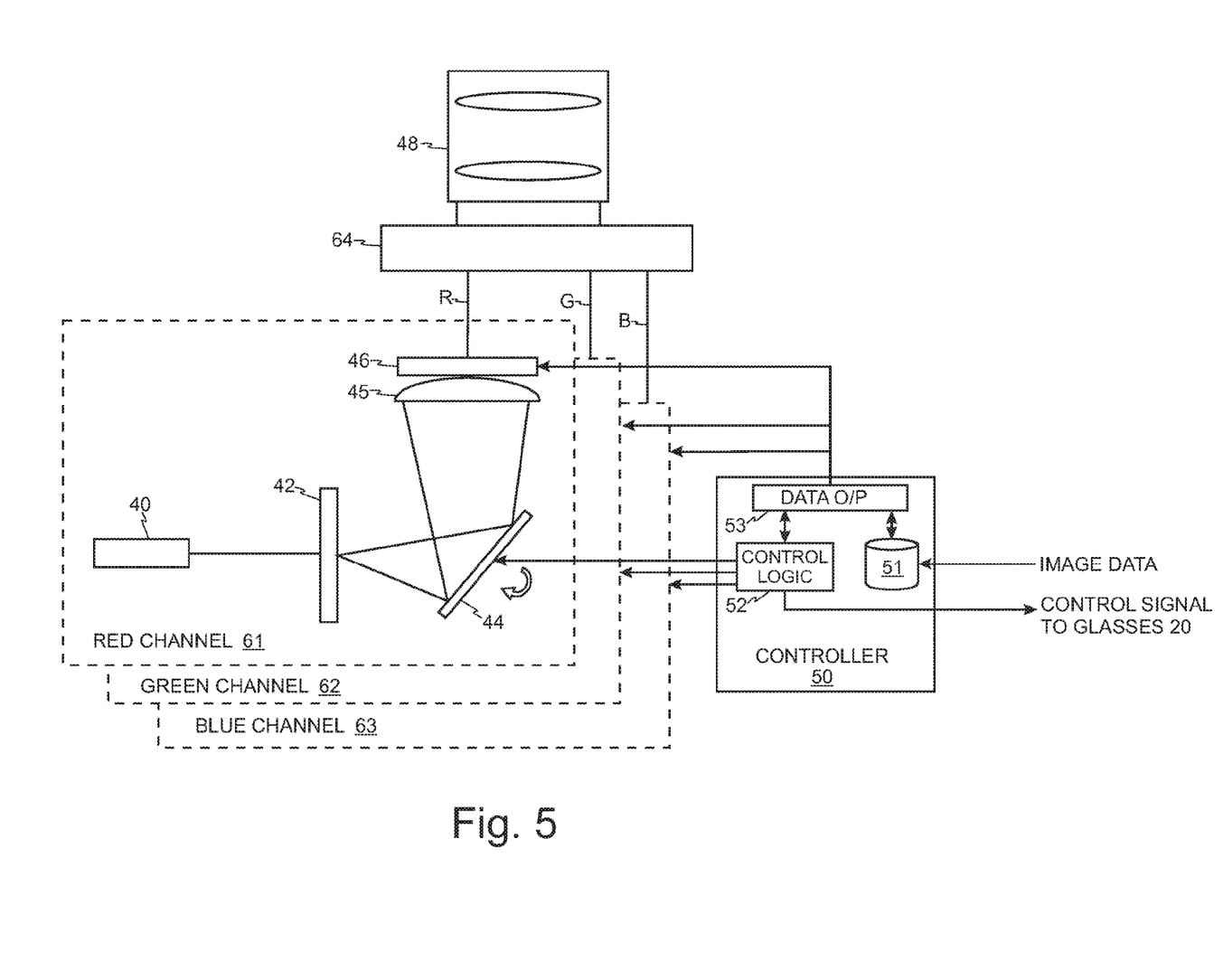
FIG. 5 shows a first embodiment of a projector with multiple colour channels which has a single light valve array per colour channel.

This is shown in FIG. 5. The apparatus comprises three colour channels: red channel 61, green channel 62, blue channel 63. Elements 40-46 of the apparatus 10 shown in FIG. 2 are provided for each colour channel 61, 62, 63. The red channel 61 is shown in detail. The outputs of the red, green and blue channels are optically combined 64. Each colour channel has a single laser source and a light valve array 46 which is fed image data only for the that colour channel. For example, the red channel 61 has a red laser and the light valve array 46 is fed data only for the red channel. In FIG. 5 the combination of the images contributed by the red, green and blue channels 61, 62, 63 occurs before the projection lens assembly 48, although the combination could occur at a different stage. It is preferred that each of the colour channels is scanned in synchronism, so that the illumination of the red, green and blue light valves occurs at substantially the same area on the display.

(ii) One Light Valve Used Sequentially for the Colour Channels

Figure 6:
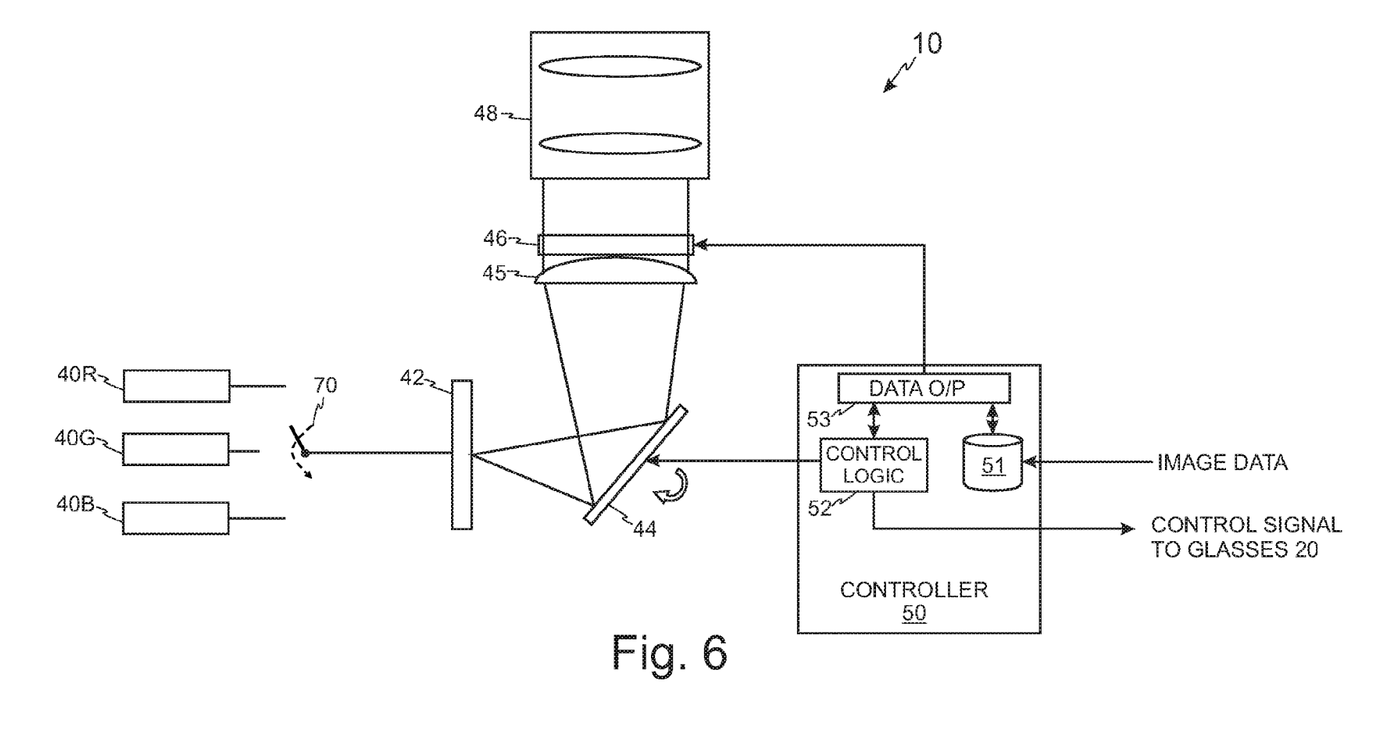
FIG. 6 shows a second embodiment of a projector with multiple colour channels which has a single light valve array which is sequentially illuminated by multiple colours.
Figure 7:
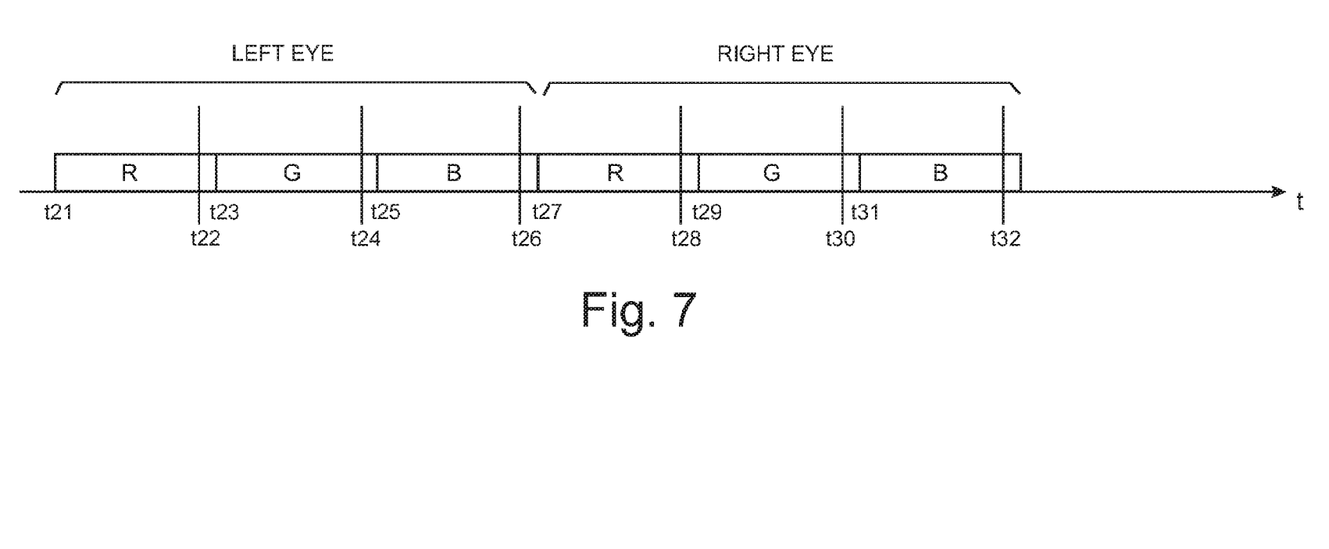
FIG. 7 shows a time line for an element of the light valve array of FIG. 6.

This is shown in FIG. 6. Three differently coloured laser light sources 40R, 40G, 40B are provided. Outputs of the light sources are selectively applied 70 to beam-shaper 42. There is a single light valve array 46 and controller 50 sequentially feeds image data for the red, green and blue channels to the single light valve array 46. The red, green and blue laser light sources are sequentially scanned across the light valve array 46 in synchronism with the light valve array 46 being set to a state for each of those colour channels. This process is repeated for the left eye and right eye channels. FIG. 7 shows a time line for operation of a single element of the light valve array 46. Firstly, the light valve element is sequentially set to a set of states for the red, green and blue colour channels of the left eye image. At time t21 the element is set to a state for the red channel. The element is scanned at time t22. At time t23 the element is set to a state for the green channel and the element is scanned at time t24. At time t25 the element is set to a state for the blue channel and the element is scanned at time t26. Next, the light valve element is sequentially set to a set of states for the red, green and blue colour channels of the right eye image. At time t27 the element is set to a state for the red channel. The element is scanned at time t28. At time t29 the element is set to a state for the green channel and the element is scanned at time t30. At time t31 the element is set to a state for the blue channel and the element is scanned at time t32. It will be appreciated that the single light valve array needs to be refreshed with new data at three times the rate of a single light valve embodiment. In case of switching between the three lasers various alternatives are possible, e.g. by turning each laser on/off or by leaving the laser continuously on and by shuttering the output as it is needed.

The number of primary colour channels (and hence lasers) can be more than three, if desired, and the principles explained above can be applied to any desired number of colour channels by adding additional sets of apparatus (FIG. 5) or additional light sources (FIG. 6).

In each of the above embodiments the light valve array is refreshed with image data, and the light valve array is scanned by the illuminating beam, on a row-by-row basis, in the direction from top to bottom. Alternatively, the refreshing of data and scanning of the illuminating beam can occur from bottom-to-top, or on a column-by-column basis from one side to another (e.g. left-to-right) or, indeed, on any other basis. For example, a circular screen could be refreshed and illuminated by concentric rings which work outwards from the centre of the display, or inwardly from the outside of the display. The only requirement is that refreshing of data occurs before scanning by the illuminating beam and that refreshing occurs during the non-illuminated period between successive scans.

The invention is not limited to the embodiments described herein, which may be modified or varied without departing from the scope of the invention. For example, the present invention may be used in direct view (e.g. with scrolling LED backlights). The present invention can be used with shuttered glasses (active stereo approach). The present invention can be used with overdrive as mentioned above and can be important for obtaining small processing delays (the delay between the availability of the image information and the displaying on the screen) and minimum image transition times so that in case of light sources with a considerable etendue, the light output can be higher. One can also scan in two directions (both horizontal and vertical), e.g. with lasers, although this is a more complex system with few substantial advantages to the presented system.

Further the present invention may be extended to frame doubling. In many LCOS and LCD panels an image frame will consist out of 2 subframes, i.e. a 120 Hz LCOS panel can receive 120 Hz images, this means at a pace of 8.33 ms (1 s/120) per image, i.e. stereo images (L-R sequences). The two subframes then would each take 4.17 ms (1 s/240). The subframes display two times the same information (hence the same image), once with a positive pixel voltage, and once with a negative pixel voltage. This is consistent with the requirement for the good operation of many LCOS and LCD devices that there is a netto zero DC voltage applied on the panel. The image is substantially the same as the liquid crystal molecules in the LCOS or LCD panels respond to the RMS voltage, and a negative or positive voltage give the same response. There are small deviations possible to this 'two times the same information/image' rule. For instance the two frames could have a little bit different information, small variations, for instance a few mV in absolute value. An example is application for instance of a temporal dithering process, or an 'overdrive' system.

Figure 9:
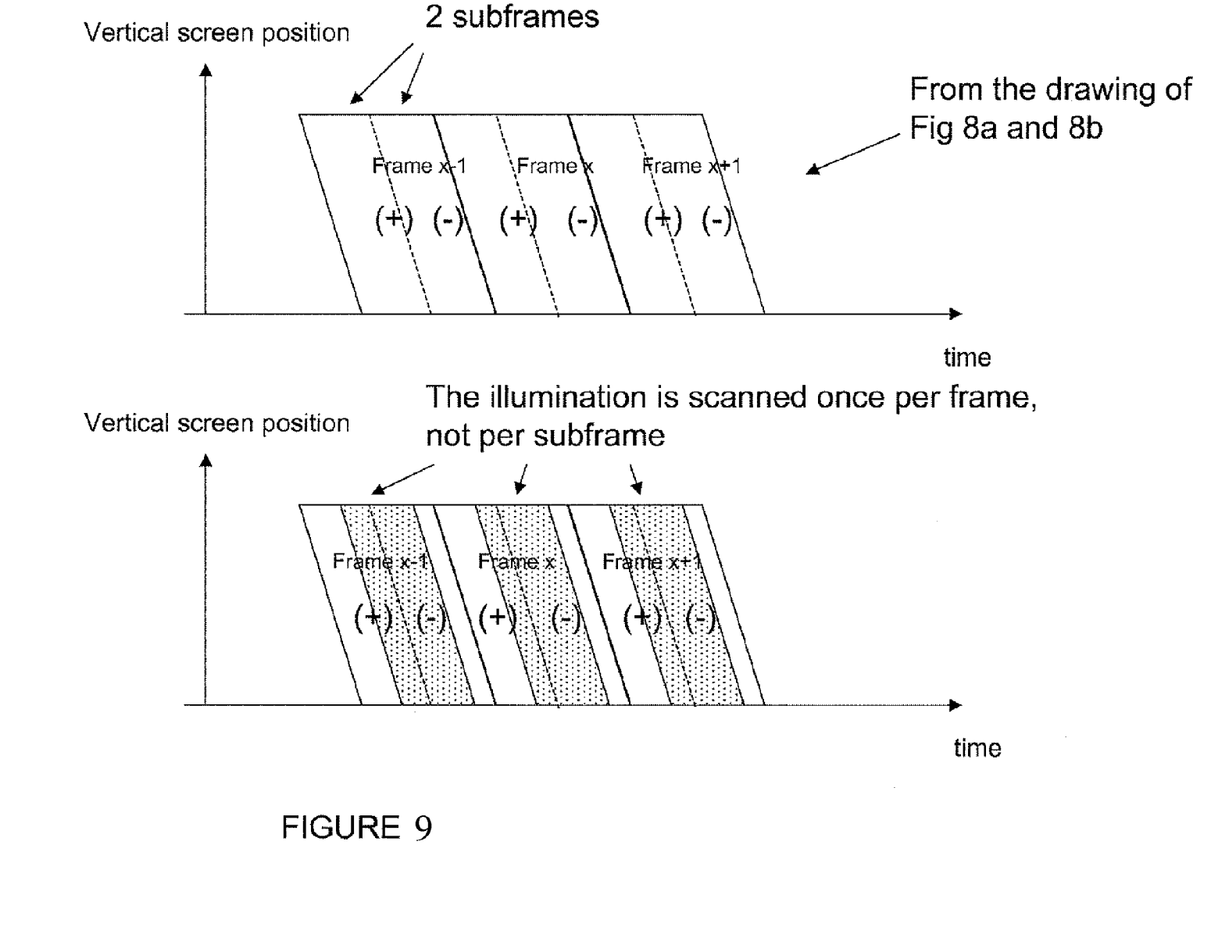
FIGS. 9 and 10 show further embodiments of the present invention which make use of frame doubling.

With reference to FIGS. 8a and 8b, the frame x−1, frame x and frame x+1 can in some cases be divided in frame x−1 (+), frame x−1 (−), frame x (+) and frame x (−), frame x+1 (+) and frame x+1 (−) etc. . . . See for example FIG. 9. This system is often referred to as 'frame doubling', as a 'double' in the sense of a copy is made. The subframes have substantially the same image and can still be treated as one image frame.

Figure 10:
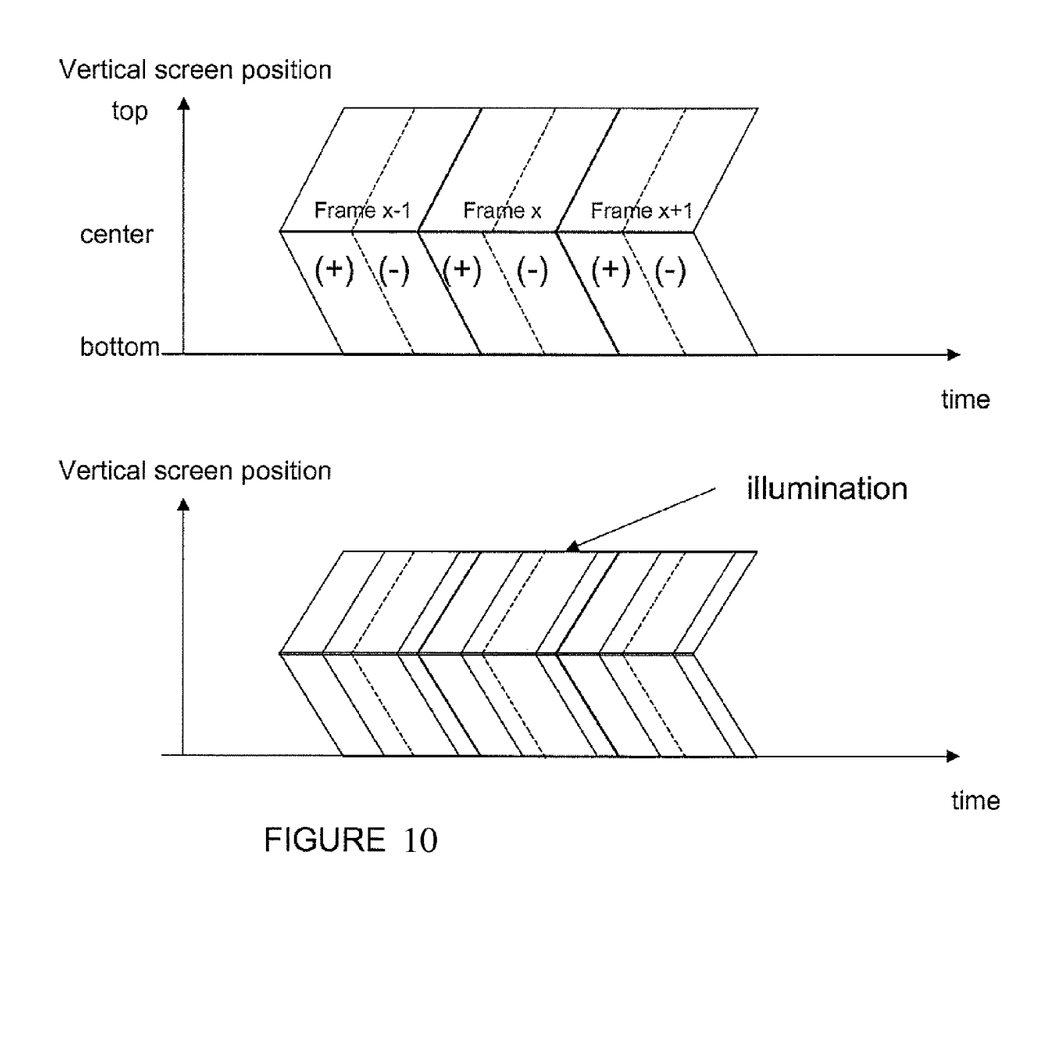

Also included within the invention is a special scanning method for a particular panel. For example, there exists a panel design with a driving method which deviates from the general description of top to bottom or bottom to top scanning. For example there is a panel that is scanned from the center towards the top and bottom. This means first the two center rows are refreshed, than the one above these too lines and the one below, etc. . . . until the top and the bottom line are refreshed se FIG. 10. This panel can have frame doubling as well, so FIG. 10 also has 'frame doubling'. Also the inverse situation is included within the scope of the invention, e.g. a top and bottom to centre scanning. For applying an illumination from the centre towards the edges or the opposite, it can be necessary to provide 2 light sources and 2 scanning devices or 1 light source and a scanning device with a 'mirror copy' effect to perform this duty. Such a system may be used with the present invention.

Also a polarisation switcher and shutter may be used instead of shuttered glasses. In some of the applications of 3D, like 3D movies, the shuttered glasses ('active glasses') are replaced by a system with an 'integral' polarization switcher in front of the projector (with integral is meant that the complete surface of the device switches together, as '1 pixel'), with less expensive passive stereo glasses for the observers. The present invention includes the use of such system with any embodiment of the present invention. Because the illumination for one eye happens in a separate timeframe than for the other eye, i.e. at time t4 to t5 on FIG. 8b, only illumination for one of the eyes is present, so the polarisation switcher can be in one state and can switch the polarisation to suit it for i.e. the left eye of the observers and then later on to the other state which suits the right eye.

The present invention also includes systems and methods which use more than 2 images at the same time, e.g. to project different stereoscopic images to different groups of people. This will require the opening time of each shutter to be reduced by the number of different groups. Also, the light valve array does not have to be 2D—e.g. could it be curved (3D).

The invention claimed is:

1. A stereoscopic display system configured to display a stereo image comprising a first image and a second image, the system comprising:
    a light valve array comprising an array of light valve elements;
    a light source configured to generate a light beam arranged to illuminate a portion of the light valve array;
    a beam-shaping element arranged to receive the light beam and to form the shaped light beam;
    a scanning device arranged to scan the shaped light beam across the light valve array;
    a control device arranged to cause light valve elements of the same light valve array to sequentially adopt a state representative of the first image of the stereoscopic image and a state representative of the second image, the first image being a left eye image and the second image being a right eye image, to cause the light valve elements to adopt a new state representative of one of the first and second images in advance of the scanning by the shaped light beam and to change to a new state representative of the other of the first and second images during a period between successive scans of the shaped light beam.

2. The display system according to claim 1, wherein the beam-shaping element is arranged to form a shaped light beam which is at least as wide as the light valve array in a first direction, and wherein the scanning device is arranged to scan the shaped beam across the light valve array in a second direction which is orthogonal to the first direction.

3. The display system according to claim 2, wherein the beam-shaping element is arranged to form a shaped beam which has a dimension which is less than 20% of the total dimension of light valve array in the second direction.

4. The display system according to claim 3, wherein the beam-shaping element is arranged to form a shaped beam which has a dimension which is substantially equal to the dimension of a single light valve element of the light valve array in the second direction.

5. The display system according to claim 3 wherein the light source is a laser.

6. The display system according to claim 1, wherein the elements of the light valve array are liquid crystal elements.

7. The display system according to claim 1, wherein the control device is configured to cause light valve elements to change to a new state using overdrive.

8. The display system according to claim 1 comprising a plurality of colour channels, each of the colour channels comprising a set of apparatus each comprising a light source for generating a light beam of that colour, a light valve array, a beam-shaping element and a scanning device, the display system further comprising a combiner configured to combine outputs of the plurality of colour channels.

9. The display system according to claim 8 further comprising a light source for each of the colour channels.

10. The display system according to claim 1 comprising a plurality of colour channels and wherein the control apparatus is arranged to cause light valve elements of the same light valve array to sequentially adopt a state representative of each of the colour channels, for each of the first image and second image of the stereoscopic image.

11. The display system according to claim 10 wherein each of the light sources is a differently coloured laser.

12. A method of forming a stereo image comprising a first image and a second image, the method comprising the steps:
    generating a light beam which can illuminate only a portion of a light valve array;
    shaping the light beam by applying the light beam to a beam-shaping element to form a shaped light beam;
    scanning the shaped light beam across the light valve array, the light valve array comprising an array of light valve elements;
    causing light valve elements of the same light valve array to sequentially adopt a state representative of the first image of the stereoscopic image and a state representative of the second image; and
    causing the light valve elements to adopt a new state representative of one of the first and second images in advance of the scanning by the light beam and to change to a new state representative of the other of the first and second images during a period between successive scans of the light beam, the first images being left eye images and the second images being right eye images.

13. The method according to claim 12, further comprising using overdrive to change the light valve elements to a new state.

14. A non-transitory computer-readable medium storing executable software configured to control a display system, the display system comprising a light source configured to generate a light beam, a beam-shaping element arranged to receive the light beam and to form a shaped light beam, a light valve array comprising an array of light valve elements and a scanning device, the software when executed by a processor of the display system, causes the processor to:
    scan the shaped light beam received from the beam-shaping element across the light valve array;
    cause light valve elements of the same light valve array to sequentially adopt a state representative of the first image of the stereoscopic image and a state representative of the second image, the first image being a left eye image and the second image being a right eye image; and,
    cause the light valve elements to adopt a new state representative of one of the first and second images in advance of the scanning by the shaped light beam and to change to a new state representative of the other of the first and second images during a period between successive scans of the shaped light beam.

15. A control unit for use with a display system configured to display a stereo image comprising a first image and a second image, the display system comprising a light source for generating a light beam, a beam-shaping element arranged to receive the light beam and to form a shaped light beam, a light valve array comprising an array of light valve elements and a scanning device, the control unit comprising:

a driver for scanning the shaped light beam received from the beam-shaping element across a light valve array;

a controller to cause light valve elements of the same light valve array to sequentially adopt a state representative of the first image of the stereoscopic image and a state representative of the second image, the first image being a left eye image and the second image being a right eye image, and, a controller to cause the light valve elements to adopt a new state representative of one of the first and second images in advance of the scanning by the shaped light beam and to change to a new state representative of the other of the first and second images during a period between successive scans of the shaped light beam.

* * * * *